US006785860B1

(12) United States Patent
Patti

(10) Patent No.: US 6,785,860 B1
(45) Date of Patent: Aug. 31, 2004

(54) ERROR-CORRECTING CODE ADAPTED FOR MEMORIES THAT STORE MULTIPLE BITS PER STORAGE CELL

(76) Inventor: Robert Patti, 1 S. 751 Avon Dr., Warrenville, IL (US) 60555

( * ) Notice: Subject to any disclaimer, the term of this patent is extended or adjusted under 35 U.S.C. 154(b) by 852 days.

(21) Appl. No.: 09/586,251

(22) Filed: May 31, 2000

(51) Int. Cl.[7] .............................................. G11C 29/00
(52) U.S. Cl. ...................................................... 714/764
(58) Field of Search ................................ 714/746, 752, 714/764; 365/185.03

(56) References Cited

U.S. PATENT DOCUMENTS

| 5,905,673 | A | * | 5/1999 | Khan ..................... 365/185.03 |
| 6,209,113 | B1 | * | 3/2001 | Roohparvar ................ 714/773 |
| 6,279,133 | B1 | * | 8/2001 | Vafai et al. ................. 714/763 |
| 6,557,138 | B1 | * | 4/2003 | Modelli ...................... 714/753 |

OTHER PUBLICATIONS

"An 8-b 650 MHz Folding ADC", Johan van Valburg et al., Dec. 1992, IEEE Journal of Solid-State Circuits, vol. 27, No. 12, pp 1662-1666.*

* cited by examiner

Primary Examiner—Albert Decady
Assistant Examiner—John P Trimmings
(74) Attorney, Agent, or Firm—Calvin B. Ward

(57) ABSTRACT

A memory that stores a plurality of data storage words, each data storage word includes a plurality of data storage cells arranged as a plurality of columns of data storage cells, at least one of the data storage cells storing data specifying a data value having 3 or more states. The memory includes a plurality of data lines, one such data line corresponding to each column of data storage cells. Each data storage cell sets its state or provides a signal representative of its state via the data line connected to that cell in response to control signals. The memory also includes an error encryption circuit for receiving a data word to be stored in the memory and generating therefrom an encrypted data storage word. The encryption circuit divides the encrypted data storage word into a plurality of sub-data storage words. The two least significant bits of the sub-data storage words are encrypted via a first error-encryption algorithm and the most significant bits of the sub-data storage words are either not encrypted or encrypted via a second error encryption algorithm, the second error encryption algorithm having a Hamming Distance that is less than the Hamming Distance of the first error-encryption algorithm. An error decrypting circuit generates a corrected data word from the uncorrected sub-data storage words by generating an increment or decrement to be added to an uncorrected sub-data storage word to arrive at a correct sub-data storage word value.

6 Claims, 1 Drawing Sheet

ERROR-CORRECTING CODE ADAPTED FOR MEMORIES THAT STORE MULTIPLE BITS PER STORAGE CELL

FIELD OF THE INVENTION

The present invention relates to memory systems, and more particularly, to a method for correcting errors in memories that store multiple bits in each memory cell.

BACKGROUND OF THE INVENTION

Computer memories typically store data in storage cells that store one bit of data, per storage cell. Each storage cell typically includes a capacitor for storing a charge representing the data bit and a transistor for selectively connecting the storage cell to a bit line during the reading and writing of data into the storage cell. For example, dynamic random-access memories (DRAMs) provide the bulk of the semiconductor-based memories on most computer systems. A DRAM stores data in the form of charge that is stored on a capacitor within the memory cell. The current commercially available DRAMs store one bit in each memory cell, which consists of a transistor and a capacitor. The cost per bit stored is determined by the size of the memory cell. In the past, cost reductions have been achieved primarily by reducing the size of the transistor and capacitor.

A second method for reducing the cost of storage is to utilize memory cells that can store multiple bits per memory cell. To store N bits per memory cell, each memory cell must provide $2^N$ discrete distinguishable states. In general, the states correspond to the charge stored on a capacitor or floating gate. The maximum number of bits that can be stored depends on the sensitivity of the circuits used to measure the stored charge, on the ability of the write circuits to precisely control the amount of charge that is stored on the capacitor, and on the noise level in the bit lines, sense amplifiers, etc. While the problems associated with the precision of the charge storing and read-out circuitry can be overcome with the aid of improved circuitry and reference cells, the problems associated with the noise levels remain. In general, there is some level of noise at which the variations in the measured charge caused by the noise is of the same order as the change in the stored charge obtained by changing the least most significant bit of the data value from a one to a zero in a statistically significant number of memory cells. As the number of bits per storage cell increases, the critical noise level decreases, since the charge difference corresponding to the least most significant bit decreases by a factor of 2 for each additional bit being stored. Hence, prior art multilevel memories have been limited to two or three bits per storage cell.

In principle, an error correcting code can be used to extend the number of bits that can be stored per storage cell. An error correcting code will be defined to be a transformation that maps each possible value of a data word onto a corresponding value in a set of storage words such that errors in storage can be detected and corrected. In general, these codes rely on the fact that only a small number of the possible storage words will be used if no errors are introduced during the storage and retrieval process. For example, in a typical error-correcting code, each 8-bit data word is transformed into a 16-bit storage word. There are only 256 possible data word values; hence, only 256 of the possible 65536 storage word values will be used in the absence of errors. When an error occurs, a valid storage word is usually converted to an invalid storage word. The error correcting system then tries to figure out which valid state would have given rise to the detected invalid state if various numbers of bits were altered by the storage operation.

The ability of an error correcting code to correct errors is measured by a quantity referred to as the "Hamming Distance" associated with the code. For example, codes with a Hamming Distance of 5 can detect errors resulting from 4 single-bit errors and correct for all possible 2 single-bit errors. A discussion of error correcting codes may be found in ERROR CORRECTING CODES, 2ND EDITION, by Peterson and Weldon, MIT PRESS, 1972, or in PRACTICAL ERROR DESIGN FOR ENGINEERS, by Neil Glover, Data Systems Technology Corp., 1982.

The number of bits in the storage words is always more than the number of bits in the data words. Hence, the use of an error-correcting code may not provide much improvement in the number of bits stored per memory cell. Consider a memory in which each memory cell, in the absence of an error-correcting code, can store 6 bits. That is, the noise levels are sufficiently low that 64 states can be stored and recovered by the sense amplifiers. To store a data word having 24 bits, 4 storage cells are needed. Now, consider the case in which the data is encoded using an error-correcting code in which 8-bit data words are replaced by 16-bit storage words and each memory cell can now store 8-bits with the same error rate after decoding. To store 24 bits of data, the memory must now store three 16-bit storage words at the improved density of 8-bits/memory cell. Hence, the error-correcting code encoded data requires 6 memory cells.

Broadly, it is the object of the present invention to provide an improved multilevel memory.

It is a further object of the present invention to provide a multilevel memory that utilizes an error-correcting code to improve the number of data bits that can be stored per storage cell.

These and other objects of the present invention will become apparent to those skilled in the art from the following detailed description of the invention and the accompanying drawings.

SUMMARY OF THE INVENTION

The present invention is a memory that stores a plurality of data storage words, each data storage word includes a plurality of data storage cells arranged as a plurality of columns of data storage cells, at least one of the data storage cells storing data specifying a data value having 3 or more states. The memory includes a plurality of data lines, one such data line corresponding to each column of data storage cells, each data storage cell having a gate for connecting that storage cell to the corresponding data line, each data storage cell assuming one of said states in response to a signal on the corresponding data line and a write signal, the state is determined by the signal on the corresponding data line. The memory includes a plurality of data writing circuits, one such data writing circuit corresponding to each data line and being connected to that data line. At least one of the data writing circuits includes a circuit for receiving a digital value having a plurality of bits and for generating a data programming signal on the corresponding data line in response to the write signal. The memory also includes an error encryption circuit for receiving a data word to be stored in the memory and generating therefrom an encrypted data storage word. The encryption circuit divides the encrypted data storage word into a plurality of sub-data storage words, at least one of the sub-data storage words having a plurality of bits and couples each sub-data storage word to a corresponding one of the data writing circuits in response to a write signal being received by the memory. The two least significant bits of the sub-data storage words are encrypted via a first error-encryption algorithm and the most significant bits of the sub-data storage words are either not encrypted or encrypted via a second error encryption algorithm, the second error encryption algorithm having a Hamming Distance that is less than the Hamming Distance of the first error-encryption algorithm. The memory includes a read circuit, responsive to a read signal, for reading out the values stored in the sub-data storage words currently connected to the data lines. The read circuit includes a plurality of sense amplifiers, one such sense amplifier coupled to each data line, each sense amplifier generating an uncorrected sub-data storage word from a signal on that line, at least one of the sub-data storage words includes a plurality of data bits. An error decrypting circuit generates a corrected data word from the uncorrected sub-data storage words. The error decrypting circuit generates an increment or decrement to be added to an uncorrected sub-data storage word to arrive at a correct sub-data storage word value.

DETAILED DESCRIPTION OF THE INVENTION

Figure 1:
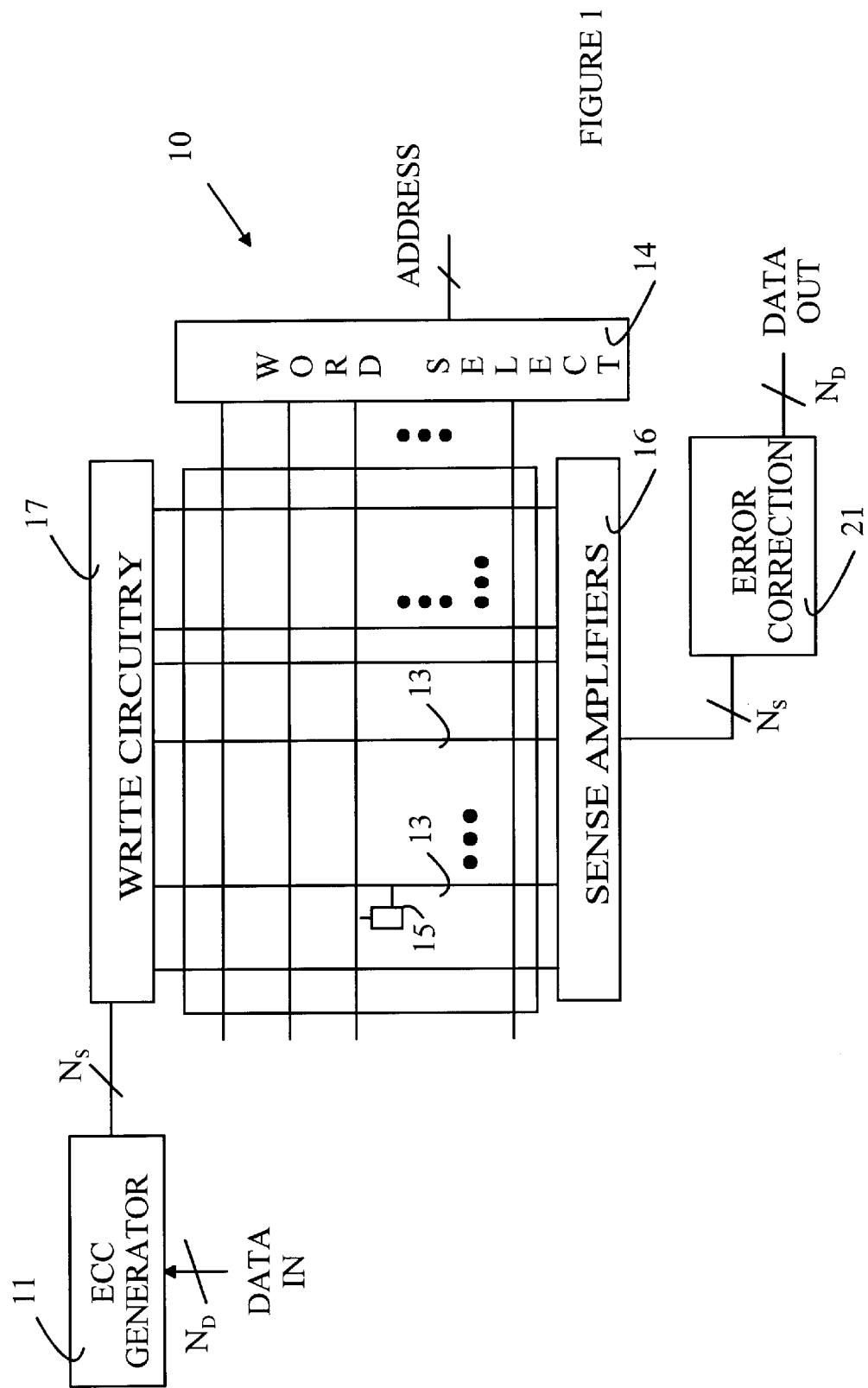
FIG. 1 is a block diagram of a memory that is organized as a plurality of data words in which each word is stored on a row of memory cells in a memory having a plurality of such rows.

To simplify the following discussion, the present invention will be explained in terms of a memory that is organized as a plurality of data words in which each word is stored on a row of memory cells in a memory having a plurality of such rows. Refer now to FIG. 1 which is a block diagram of such a memory. A data word having $N_D$ bits to be written into memory 10 is received by error-correcting code generator 11 and converted into a storage word having $N_S$ bits by error-correcting code generator 11 using the error correcting codes discussed below. Memory 10 is constructed from memory cells 15 that store an analog value. The analog value is coupled to a memory cell via a corresponding data line that is connected to a column of such memory cells. Exemplary data lines are shown at 13. At any given time, at most, one of the memory cells is connected to the data line. The memory cell so connected is determined by a row select circuit 14 that maps the word address of the data word to the corresponding row in the memory. The analog value stored in a memory cell is read by a sense amplifier in an array of sense amplifiers 16 that converts the value back to a digital value.

In general, the number of bits that can be stored in any given memory cell is less than the number of bits in a data word, which, in turn is less than the number of bits in the error-correcting code storage word. Accordingly, the $N_S$ bits of the encoded storage word must be broken up into sub-words that are stored in the individual memory cells. Either error-correcting code generator 11 or write circuit 17 can perform this function. In the preferred embodiment of the present invention, this is performed by error-correcting code generator 11. Denote the number of bits that are stored in each memory cell by NC. That is, the sense amplifiers can detect $2^{NC}$ different analog states on the corresponding data lines. The write circuitry 17 divides the $N_S$ bits into $N_S/NC$ "chunks" or sub-data storage words and converts each chunk to an analog value that is placed on a corresponding data line during a write operation. In the preferred embodiment of the present invention, each storage word also includes a number of calibration memory cells. Each time a storage word is written, predetermined values are written into these storage words.

During a read operation, the analog values placed on the data lines by the selected storage cells, including the calibration storage cells, are digitized by A/D converters in the sense amplifiers and the $N_S$ bits of the storage words are recovered and sent to the error correction circuit 21 which recovers the $N_D$ data bits. The calibration values correct for charge leakage from the storage cells between the write and read operations. Since the present invention does not depend on the use of the calibration cells, they will not be discussed in detail here. The user is referred to U.S. patent applications Ser. Nos. 09/476,625 and 09/417,040, which are hereby incorporated by reference for a more detailed discussion of the calibration procedure. For the purposes of the present discussion, it is sufficient to note that the outputs from the storage calibration memory cells are linearly interpolated to determine the values assigned to each of the data chunks.

The present invention is based on the observation that the various bits of the storage word do not have equal probabilities of being corrupted, and hence, error correcting bits can be saved by not error encoding all bits of the storage word with the same level of error correction. Furthermore, the errors encountered in multi-level storage systems are more correlated than the errors obtained in single bit memory systems.

Consider the NC bits stored on one of the memory cells. For the purposes of this discussion, it will be assumed that each memory cell converts an analog voltage or current on the corresponding data line to a charge on a capacitor within the memory cell. Each bit corresponds to an increment of charge. The least significant bit will be defined to be that bit for which the change in the charge on the capacitor is the least when the bit is switched from on to off. A noise pulse is more likely to alter the charge on the capacitor by an amount equal to the charge increment corresponding to the least significant bit than by an amount equal to the charge increment resulting from the most significant bit being switched from on to off. Furthermore, a slight increase in the leakage rate from a capacitor relative to the capacitors in the reference storage cells will most likely lead to an error that is equivalent from subtracting 1 or 2 from the correct value. It should be noted that subtracting a 1 from the value stored in a memory cell can alter a large number of bits in binary representation of that value. For example, consider a memory cell that stores an 8-bit chunk in which the value 128 was stored (10000000) prior to the error that is equivalent to subtracting 1 from the value stored therein. Subtracting a 1 results in the binary value 01111111. Hence, even a one bit alteration can lead to all of the bits of the chunk changing state, i.e., a one bit error in value leads to an 8 bit error. If, however, the same error was applied to a chunk value of 129, only a single bit error would result, i.e., the least significant bit would be switched from a 1 to a 0.

A single bit error that leads to more than one bit being altered in the chunk value will be referred to as a cascade error in the following discussion. The "128" that was converted to "127" is an example of a large cascade error. Cascade errors are expected to be common in multi-level memories because the most common mode of error generation is variation in charge leakage or noise in the read/write circuitry. In the absence of calibration cells, charge leakage errors almost always result in the reduction of the value stored by a small increment. If the values stored are corrected for charge leakage by using calibration cells, then, in principle, the errors can result in an increase in the estimation of the value stored as well. This latter case results from charge leakage in a calibration cell, rather than leakage in the memory cell storing the chunk.

The present invention makes use of the observation that, in the absence of cascade errors, all of the errors would occur in the least most significant bits of the chunk. Hence, providing error correction bits for the most significant bits of each chunk provides little if any improvement in the error rate while increasing the number of bits that must be stored in the memory to represent the original $N_D$ data bits.

The manner in which the present invention generates its error correcting bits will now be explained in more detail. To simplify the following discussion, denote the NC bits of $k^{th}$ chunk by b(k,n) where n runs from 0 to NC−1, and n=0 is the least significant bit. Here, k runs from 1 to NC. In the absence of error correction, the number of memory cells needed to store each data word would be the smallest integer that is greater than or equal to $N_D$/NC. Denote this quantity by M. Write circuit 17 cuts the $N_D$ data bits into M chunks and assigns each chunk to a storage cell. Note that the last storage cell may not have full NC bits. In this case, the least most significant bits are omitted for this storage cell, i.e., set to zero. Form a new word from the least most significant bit of each chunk, i.e., [b(1,0), b(2,0), ..., b(M,0)]. Encrypt this word using an error correcting code to obtain an encoded word having bits $[e_1, e_2, ..., e_P]$, where P>M. Replace the least significant bit of each chunk by the corresponding error coded bit, i.e, replace b(1,0) by $e_1$, b(2,0) by $e_2$, ..., and b(M,0) by $e_M$. Group the remaining error coded bits into one or more additional chunks. Convert each chunk to an analog value and store it in a corresponding memory cell together with the reference cells discussed above.

If only single bit errors in b(k,0) were likely, and no cascade errors were present, this simple coding scheme can correct for most errors provided a code having an appropriate Hamming Distance is utilized. In this case, data is read from the memory by the reverse process. The analog value stored in each memory cell is converted back to a digital value. The least significant bits of each chunk and the bits of the additional chunks are decoded by the error correction circuit 21 to provide the error corrected least significant bits of each of the M chunks in which data was stored. These bits are placed in the least significant position of each of the M chunks and the original ND data bits re-assembled.

The potential improvement provided by restricting full error encoding to the least most significant bits of the chunks may be more easily seen with reference to a simple example. Consider a memory in which each memory cell stores 8 bits and $N_D$=64. Assume that the error code that maps 8 bits into 16 bits is used. Using the method of the present invention, one additional column of memory cells is needed to store the 8 additional bits generated by the error correction algorithm. In contrast, if the entire 64 bit data word was encoded using the same level of error correction, an additional 64 error bits would be needed, i.e., an additional 8 columns of memory cells.

Unfortunately, as noted above, cascade errors are expected to be common. Cascade errors can easily extend into the most significant bits of each chunk. Hence, if one were to attempt to correct for cascade errors by using a conventional error-correcting code, all of the bits in the data word would need to be coded, and the advantages of incorporating the error correcting bits would be greatly diminished. Furthermore, codes with very large Hamming Distances, and hence, large numbers of bits would be needed since the number of bits in an error could be quite large.

Accordingly, the preferred embodiment of the present invention uses a somewhat different strategy for dealing with cascade errors. The manner in which the present invention operates may be more easily understood with reference to a simple example. Assume that the maximum charge leakage between a write and a subsequent read operation to the same address can result in adding or subtracting 1 to the value stored in a memory cell. In general, the memory is designed to meet some error criterion, i.e., the data is accurate to within one error in $10^x$ write-read operations. Also assume that the two least most significant bits of all of the chunks have been encoded with an error-correcting code having a Hamming Distance that allows all errors in these bits to be corrected to within the design specification.

There are 8 possible combinations for the least significant two bits of a chunk that has been corrected using the error-correcting code assuming that the errors resulted from 1 being added or subtracted to the correct value to arrive at the measured chunk value as returned by the sense amplifiers. Six of these 8 cases are correct after correcting the two least most significant bits of the chunk using the error-correcting code applied in the conventional manner. The remaining two cases involve cascade errors that extend beyond the two least most significant bits and must be corrected using a different algorithm. Denote the least most significant bits of a chunk by (x,y), where x is the least most significant bit. For example, if the error-correcting code converts a (1,0) as measured by the sense amplifiers to a (0,1), a 1 was subtracted from the original chunk value to arrive at the erroneous value, and the error-corrected value for the entire chunk is now correct. However, the conversion of (1,1) to (0,0) by the error-correcting code indicates that one was subtracted from the original value, and the more significant bits of the chunk have also been altered. Similarly, the conversion of (0,0) to (1,1) by the error correcting code indicates that one was added to the original value, and the more significant bits of the chunk have also been altered. In these cases, the results obtained after applying the error-correcting code are still in error.

These last two cases can be corrected by using the error-correcting code to define the increment or decrement that was applied to the correct chunk value to arrive at the value returned by the sense amplifiers. The value returned is then decremented or incremented by this amount to arrive at the corrected value. For example, in the case in which the error-correcting code converts (0,0) to (1,1), the correct chunk value is the value returned by the sense amplifiers minus 1.

The example discussed above used error-correcting codes to protect the two least significant bits of the chunks and to correct for errors resulting from incrementing or decrementing the stored value by 1. By increasing the number of bits that are protected, embodiments that correct for larger increments can be constructed. In general, to correct for errors resulting from an increment or decrement of up to $2^P-1$, the (p+1) least significant bits of the chunks must be protected by error-correcting codes.

Hence, if errors up to 3 in magnitude are to be corrected, the three least most significant bits must be protected by error-correcting codes. In this case, the error-correcting code corrects all cases except those for which the error-correcting code changed (x,0,0) to (y,1,1) or for which (x,1,1) was converted to (y,0,0). Here, x and y are in the least-most significant bits. In these cases, the increment or decrement is computed from the difference of the three-bit numbers before and after applying the error-correcting code. The difference is then used to decrement or increment the chunk value returned by the sense amplifiers.

While the cascade errors are treated differently by the above-described embodiments of the present invention, in reality all of the chunks can be treated in the same two step process. In the first step, the error-correcting code is applied to the least most significant bits of the chunks to determine the amount, if any, by which the value originally stored in each chunk was altered by the storage and retrieval operations performed on that chunk. The value returned by the sense amplifier for that chunk is then incremented or decremented accordingly to arrive at the error-corrected value for that chunk. This second step only alters the chunk values in those cases in which a cascade error has occurred, since the error correcting code in effect performed the addition or subtraction to the least most significant bits at the time the code decrypted these bits.

While the majority of errors encountered in a multi-level memory are expected to be of the type discussed above, there will still be some random errors that are not generated by incrementing or decrementing the contents of the memory cells by a small amount. To the extent that these occur in the most significant bits of the stored values, these errors will not be detected. Embodiments in which these random errors are detected and corrected can also be constructed by encoding the most significant bits with an error-correcting code. Since these errors are of a much lower probability, a code having a much smaller Hamming Distance can be utilized. Hence, the additional error-correcting bits will not result in a large decrease in the storage efficiency of the memory.

The above-described embodiments of the present invention have utilized a memory system in which the chunks are stored on individual storage cells that store multiple bits per cell as an analog value represented by a charge, voltage, or current. However, the same error encoding method may be utilized in other systems that utilize multi-bit quantities to represent data. For example, disk drives that store data as an analog value generated by adjusting the intensity of a light beam may also benefit from the error correction system of the present invention. In this case, each record is equivalent to a storage word.

Various modifications to the present invention will become apparent to those skilled in the art from the foregoing description and accompanying drawings. Accordingly, the present invention is to be limited solely by the scope of the following claims.

What is claimed is:

1. A memory comprising:

a plurality of data storage words, each data storage word comprising a plurality of data storage cells, at least one of said data storage cells storing data specifying a data value having 3 or more states;

a plurality of data lines, one such data line corresponding to each data storage cell, said corresponding data storage cell being connected to that data line, each data storage cell comprising a gate for connecting that storage cell to said corresponding data line, each data storage cell assuming one of said states in response to a signal on said corresponding data line and a write signal, said state being determined by said signal on said corresponding data line;

a plurality of data writing circuits, one such data writing circuit corresponding to each data line and being connected to that data line, at least one of said data writing circuits comprising a circuit for receiving a digital value having a plurality of bits and for generating a data programming signal on said corresponding data line in response to said write signal; and an error encryption circuit for receiving a data word to be stored in said memory and generating therefrom an encrypted data storage word, dividing said encrypted data storage word into a plurality of sub-data storage words, at least one of said sub-data storage words having a plurality of bits; and coupling each sub-data storage word to a corresponding one of said data writing circuits in response to a write signal being received by said memory, wherein the least significant two bits of said sub-data storage words are encrypted via a first error-encryption algorithm and the most significant bits of said sub-data storage words are either not encrypted or encrypted via a second error encryption algorithm, said second error encryption algorithm having a Hamming Distance that is less than the Hamming Distance of said first error-encryption algorithm.

2. The memory of claim 1 further comprising a read circuit coupled to said data lines and being responsive to a read signal being coupled to said memory, said read circuit comprising a plurality of sense amplifiers, one such sense amplifier coupled to each data line, each sense amplifier generating an uncorrected sub-data storage word from a signal on that line, at least one of said sub-data storage words comprising a plurality of data bits; and an error decrypting circuit for generating a corrected data word from said uncorrected sub-data storage words by using said first error encryption algorithm.

3. The memory of claim 1 wherein said error encryption circuit also encrypts the third least most significant bits of said sub-data storage words via a third error encryption algorithm having a Hamming distance less than that of said first error encryption algorithm.

4. The memory of claim 2 wherein said error decrypting circuit determines a value by which one of said uncorrected sub-data storage words is incremented or decremented to arrive at said corrected data word.

5. In a memory comprising a plurality of data storage words, each data storage word comprising a plurality of data storage cells, each of said data storage cells storing data specifying a data value representing a plurality of bits, said memory including circuitry for selecting a data storage word for reading and writing and circuitry for reading and writing each of said data storage cells corresponding to that data storage word, said write circuitry storing a value in each of said data storage cells and said read circuitry returning the value stored in each of said data storage cells, the improvement comprising;

an error encryption circuit for receiving a data word to be stored in said memory and generating therefrom an encrypted data storage word, dividing said encrypted data storage word into a plurality of sub-data storage words, at least one of said sub-data storage words having a plurality of bits; and storing a value representative of each of said sub-data storage words in a corresponding one of said data storage cells, wherein the least significant two bits of said sub-data storage words are encrypted via a first error-encryption algorithm and the most significant bits of said sub-data storage words are either not encrypted or encrypted via a second error encryption algorithm, said second error encryption algorithm having a Hamming Distance that is less than the Hamming Distance of said first error-encryption algorithm.

6. The memory of claim 5 further comprising an error decryption circuit, said error decryption circuit decrypting said two least most significant bits of each sub-data storage word to determine an increment or decrement to be applied to the value stored in that sub-data storage word to arrive at an error-corrected sub-data storage word value.

* * * * *